US012580116B2

(12) United States Patent
Wang et al.

(10) Patent No.: US 12,580,116 B2
(45) Date of Patent: Mar. 17, 2026

(54) PLANAR TRANSFORMER AND ACTIVE CIRCUIT

(71) Applicant: Huawei Digital Power Technologies Co., Ltd., Shenzhen (CN)

(72) Inventors: Ning Wang, Dongguan (CN); Jiebin Cheng, Dongguan (CN); Wei Tan, Vienna (AT)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 995 days.

(21) Appl. No.: 17/721,034

(22) Filed: Apr. 14, 2022

(65) Prior Publication Data

US 2022/0238268 A1 Jul. 28, 2022

Related U.S. Application Data

(63) Continuation of application No. PCT/CN2020/093655, filed on Jun. 1, 2020.

(30) Foreign Application Priority Data

Oct. 14, 2019 (CN) ......................... 201910974525.8

(51) Int. Cl.
*H01F 27/28* (2006.01)
*H01F 27/24* (2006.01)

(52) U.S. Cl.
CPC ......... *H01F 27/24* (2013.01); *H01F 27/2823* (2013.01)

(58) Field of Classification Search
CPC ................. H01F 27/24; H01F 27/2823; H01F 2027/2809; H01F 2027/2814;
(Continued)

(56) References Cited

U.S. PATENT DOCUMENTS

| | | | | |
|---|---|---|---|---|
| 6,348,848 | B1 | 2/2002 | Herbert | |
| 10,074,474 | B2 * | 9/2018 | Harrison | H01F 27/2804 |

(Continued)

FOREIGN PATENT DOCUMENTS

| | | | |
|---|---|---|---|
| CN | 1409333 | A | 4/2003 |
| CN | 1426590 | A | 6/2003 |

(Continued)

OTHER PUBLICATIONS

"New Magnetic Structure for a Low Profile Planar Transformer," IBM Technical Disclosure Bulletin, vol. 28, No. 10, Total 3 pages, XP-000919135, International Business Machines Corp., Thornwood, US (Mar. 1986).

(Continued)

*Primary Examiner* — Mang Tin Bik Lian
(74) *Attorney, Agent, or Firm* — Leydig, Voit & Mayer, Ltd.

(57) ABSTRACT

This application provides a planar transformer and an active circuit, applied to a telecommunications device and a communications power supply in fields such as a 5G mobile communications technology and cloud computing. The planar transformer includes a winding structure and a magnetic core structure. The winding structure includes a primary-side winding and a secondary-side winding. The magnetic core structure includes a first magnet part, a second magnet part, and a plurality of magnetic cylinders. The plurality of magnetic cylinders are located between the first magnet part and the second magnet part. The primary-side winding is wound around M magnetic cylinders in the plurality of magnetic cylinders, wherein M is a positive integer equal to or greater than three (3). A cross-sectional area of at least one of the M magnetic cylinders is different from a cross-sectional area of another magnetic cylinder.

20 Claims, 11 Drawing Sheets

(58) Field of Classification Search
CPC ........ H01F 27/2804; H01F 27/38; H01F 3/10; H01F 2027/2819; H01F 27/306
See application file for complete search history.

(56) References Cited

U.S. PATENT DOCUMENTS

| | | | | |
|---|---|---|---|---|
| 10,468,181 | B1 * | 11/2019 | Vinciarelli | H05K 3/4697 |
| 10,790,081 | B2 * | 9/2020 | Fei | H01F 27/2804 |
| 2008/0048818 | A1 * | 2/2008 | Mao | H01F 27/34 336/213 |
| 2010/0232181 | A1 * | 9/2010 | Nakahori | H01F 27/2804 336/221 |
| 2019/0043653 | A1 | 2/2019 | Dai et al. | |
| 2019/0043660 | A1 * | 2/2019 | Jin | H02M 3/33592 |
| 2020/0350117 | A1 * | 11/2020 | Nabih | H01F 27/40 |
| 2020/0395164 | A1 * | 12/2020 | Ahmed | H01F 27/2804 |
| 2021/0304945 | A1 | 9/2021 | Tan et al. | |

FOREIGN PATENT DOCUMENTS

| | | | |
|---|---|---|---|
| CN | 1257518 | C | 5/2006 |
| CN | 101930824 | A | 12/2010 |
| CN | 102474187 | A | 5/2012 |
| CN | 204632497 | U | 9/2015 |
| CN | 106971829 | A | 7/2017 |
| CN | 107946045 | A | 4/2018 |
| CN | 108648899 | A | 10/2018 |
| CN | 108987065 | A | 12/2018 |
| CN | 109390131 | A | 2/2019 |
| CN | 110828126 | A | 2/2020 |
| JP | 2010278387 | A | 12/2010 |
| WO | 2018160962 | A1 | 9/2018 |
| WO | 2020115389 | A1 | 6/2020 |

OTHER PUBLICATIONS

Li et al., "A Half-Turn Transformer With Symmetry Magnetic Flux for High-Frequency-Isolated DC/DC Converters," IEEE Transactions on Power Electronics, vol. 33, No. 8, pp. 6467-6470, Institute of Electrical and Electronics Engineers, New York, New York (Aug. 2018).

* cited by examiner

PLANAR TRANSFORMER AND ACTIVE CIRCUIT

CROSS-REFERENCE TO RELATED APPLICATIONS

This application is a continuation of International Application No. PCT/CN2020/093655, filed on Jun. 1, 2020, which claims priority to Chinese Patent Application No. 201910974525.8, filed on Oct. 14, 2019. The disclosures of the aforementioned applications are hereby incorporated by reference in their entireties.

TECHNICAL FIELD

Embodiments of this application relate to the circuit field, and in particular, to a planar transformer and an active circuit.

BACKGROUND

A planar transformer uses a copper foil route inside a multilayer printed circuit board (PCB) as a winding, and has advantages such as a flexible winding design, simple assembly, and a high power density. A direct current conversion power supply used in a telecom device is mostly designed in a form of a board-mounted power, and a transformer is mainly designed in a form of a planar transformer.

In a winding design of the planar transformer, when a quantity of layers of the multilayer PCB and a copper thickness of copper foil at each layer are kept unchanged, the following solutions are usually used to reduce a loss of the transformer: 1. A winding stack of the planar transformer is optimized to reduce an eddy current loss of the winding stack. 2. Winding terminal routing of the planar transformer is optimized to reduce a terminal loss. 3. Quantities of turns on a primary side and a secondary side of the transformer are reduced, to reduce a conduction loss of a winding. In the foregoing three solutions to reduce the loss, the first two solutions are common, and are used when the planar transformer is designed. However, the loss can be reduced only to an extent. The third solution is simple in use, but has a limitation. Specifically, the transformer generally includes a primary-side winding and a secondary-side winding, a transformation ratio K is equal to a ratio of a quantity Np of turns of the primary-side winding to a quantity Ns of turns of the secondary-side winding, and K>0. When the transformer is designed, different values are selected for the transformation ratio K based on an input/output voltage requirement, that is, when the transformer is designed, the value of K is determined based on a design requirement. Based on the value of K, when a quantity of winding turns is selected, the quantity Np of turns of the primary-side winding and the quantity Ns of turns of the secondary-side winding are diversified. For example, a transformer of Np/Ns=2.5 is designed. When a magnetic core is not saturated, there are a plurality of combinations of Np and Ns, for example, Np=20 and Ns=8, or Np=10 and Ns=4, or Np=5 and Ns=2. To reduce the loss of the transformer, in a conventional design of a winding of a transformer, small Np and Ns are usually selected. For example, in the foregoing transformer design in which K=2.5, a winding solution in which Np=5 and Ns=2 is selected. A disadvantage of the conventional transformer design is as follows: Once the quantity Np of turns of the primary-side winding and the quantity Ns of turns of the secondary-side winding are simplified to have no common divisor, Np and Ns cannot be further smaller. This restricts further reduction of the loss of the transformer. In addition, if the loss of the transformer is high, a heat dissipation density of a power supply increases when a power of the power supply increases. As a result, a high-power power supply is required to meet a heat dissipation requirement, and consequently an improvement of a power density of the power supply is restricted.

SUMMARY

Embodiments of this application provide a planar transformer, which can effectively reduce a quantity of winding turns of the transformer, reduce a winding loss of the transformer, and improve efficiency of the transformer.

According to a first aspect, this application provides a planar transformer, including a winding structure and a magnetic core structure, where the winding structure includes a primary-side winding and a secondary-side winding, the magnetic core structure includes a first magnet part, a second magnet part, and a plurality of magnetic cylinders, the plurality of magnetic cylinders are located between the first magnet part and the second magnet part, the primary-side winding is wound around M magnetic cylinders in the plurality of magnetic cylinders, M is a positive integer, M≥3, and a cross-sectional area of at least one of the M magnetic cylinders is different from a cross-sectional area of another magnetic cylinder.

According to the planar transformer having the structure, a size of the magnetic cylinder is changed, so that a cross-sectional area of at least one magnetic cylinder is different from a cross-sectional area of another magnetic cylinder. Therefore, when a winding is wound around the magnetic cylinder, partial magnetic flux is canceled, and a fractional transformation ratio may be further obtained. Compared with a conventional transformer that obtains a same fractional transformation ratio, according to the transformer provided in this application, a quantity of turns of the secondary-side winding can be effectively reduced. Therefore, this helps reduce a direct current resistance and an alternating current resistance (DCR/ACR) of the winding of the transformer, so that conversion efficiency of the planar transformer can be effectively improved. When the planar transformer is applied to a power supply, a high power density of the power supply can be effectively improved, and thermal performance of the power supply can be improved.

With reference to the first aspect, in a first possible implementation of the transformer, the primary-side winding is wound around the M magnetic cylinders in series or in series and parallel; and series and parallel winding means that the primary-side winding is wound around X magnetic cylinders in series, and is wound around M-X magnetic cylinders in parallel, where X is a positive integer less than a value of M.

The primary-side winding is wound around the M magnetic cylinders in series, so that a fractional transformation ratio of the transformer can be implemented in a simple winding manner. This has an advantage of a simple manufacture process. The primary-side winding is wound around the M magnetic cylinders in series and parallel, so that winding can be performed around a small quantity of magnetic cylinders of the transformer to implement a fractional transformation ratio of the transformer, to reduce a size or space of the transformer. When the planar transformer is applied to a power supply, a high power density of the power supply can be effectively improved. In addition, regardless of whether the primary-side winding is wound around the M magnetic cylinders in series or in series and parallel, compared with a conventional planar transformer that implements a same fractional transformation ratio, the transformer provided in this application has smaller quantity of winding turns, so that a loss of the transformer can be effectively reduced.

With reference to the first aspect or the first possible implementation of the first aspect, in a second possible implementation of the transformer, the transformer further includes at least one primary-side parallel winding. Each primary-side parallel winding is wound around at least a part of magnetic cylinders in the plurality of magnetic cylinders in series or in series and parallel. Preferably, each primary-side parallel winding is wound around other M magnetic cylinders in the plurality of magnetic cylinders in series or in series and parallel. The primary-side winding and the at least one primary-side parallel winding are connected in parallel.

With reference to the second possible implementation of the first aspect, in a third possible implementation of the transformer, a ratio of a sum of cross-sectional areas, of magnetic cylinders around which each primary-side parallel winding is wound, to a sum of cross-sectional areas of the M magnetic cylinders around which the primary-side winding is wound is from 80% to 120%.

With reference to any one of the first aspect, or the foregoing implementations of the first aspect, in a fourth possible implementation of the transformer, the secondary-side winding is wound around one of the plurality of magnetic cylinders.

With reference to the fourth possible implementation of the first aspect, in a fifth possible implementation of the transformer, the transformer further includes at least one secondary-side parallel winding, each secondary-side parallel winding is wound around one of the plurality of magnetic cylinders, and the secondary-side winding and the at least one secondary-side parallel winding are connected in parallel.

With reference to the fifth possible implementation of the first aspect, in a sixth possible implementation of the transformer, a total quantity of secondary-side windings and at least one secondary-side parallel winding is P. P is a positive integer, and $P \geq 2$. A ratio of cross-sectional areas of P magnetic cylinders corresponding to the P secondary-side windings and parallel windings is $A1:A2: \ldots :AP$. Quantities of turns of the P secondary-side windings and secondary-side parallel windings around the P magnetic cylinders are respectively Ns1, Ns2, . . . , and NsP. Values of A1*Ns1, A2*Ns2, . . . , and AP*NsP meet at least one of the following conditions: the values are equal, or a ratio between any two values is from 80% to 120%.

With reference to any one of the first aspect, or the foregoing implementations of the first aspect, in a seventh possible implementation of the transformer, in the plurality of magnetic cylinders, at least a part of magnetic cylinders and the first magnet part are an integral structure, and/or at least a part of magnetic cylinders and the second magnet part are an integral structure: or each of the plurality of magnetic cylinders includes an upper magnetic cylinder and a lower magnetic cylinder, where at least a part of upper magnetic cylinders and the first magnet part are an integral structure, and/or at least a part of lower magnetic cylinders and the second magnet part are an integral structure.

With reference to the seventh possible implementation of the first aspect, in an eighth possible implementation of the transformer, a cross section of the magnetic cylinder is circular, oval, rectangular, square, or irregularly shaped.

According to a second aspect, an active circuit is provided. The active circuit includes the planar transformer according to any one of the first aspect or the implementations of the first aspect.

The planar transformer provided in this application is designed to be flexible. A transformer with different fractional turns ratios may be designed by changing a quantity and an area of magnetic core cylinders of the transformer and cooperating with a corresponding winding design. The planar transformer may be flexibly applied to power supplies with different input and output voltages, and has beneficial effects of reducing a quantity of winding turns and reducing a winding loss.

BRIEF DESCRIPTION OF DRAWINGS

FIG. 1-2 is a schematic diagram of a winding manner of a secondary-side winding of a transformer according to a conventional technology 1;

FIG. 1-3 is a schematic diagram of a winding manner of a primary-side winding of a transformer according to a conventional technology 1;

FIG. 2-1 is a schematic diagram of a current flow direction of a secondary-side winding of a transformer according to a conventional technology 2;

FIG. 2-2 is a schematic diagram of a structure of a transformer with two full-bridge units according to a conventional technology 2;

FIG. 2-3 is a schematic diagram of a structure of a transformer with four full-bridge units according to a conventional technology 2;

FIG. 3-1 is a schematic diagram of a structure of a transformer whose side cylinder has a groove according to a conventional technology 3;

FIG. 3-2 is a schematic diagram of a structure of a transformer whose side cylinder has a through hole according to a conventional technology 3;

FIG. 4-1 and FIG. 4-2 are schematic diagrams of a magnetic core structure of a planar transformer according to an embodiment of this application;

FIG. 8-1, FIG. 8-2, FIG. 8-3, and FIG. 8-4 are schematic diagrams of yet another winding structure (including one primary-side winding and a plurality of secondary-side windings) of a planar transformer according to an embodiment of this application.

DESCRIPTION OF EMBODIMENTS

To make the objectives, technical solutions, and advantages of this application clearer, the following further describes this application in detail with reference to the accompanying drawings. In the description of this application, unless otherwise specified, "a plurality of" means two or more than two.

In the conventional technology, a conventional technology 1 exists, which can implement a transformer design of 0.5 turns on a secondary side. An actual quantity of winding turns may be designed as n/2:0.5 for a transformer whose ratio of turns of primary-side windings to turns of secondary-side windings is n:1 (n is an even number greater than 0)).

Figure 1:
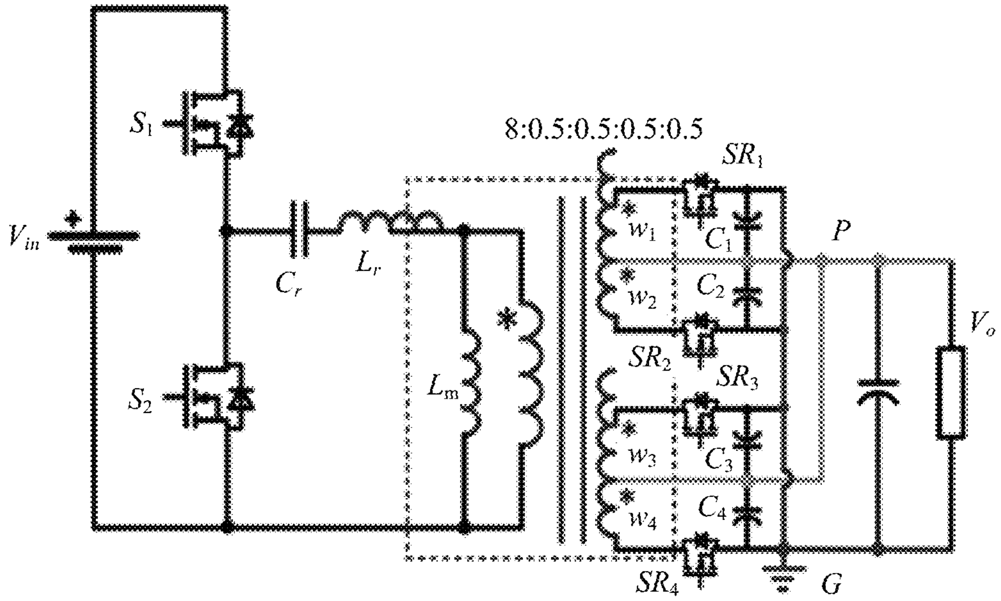
FIG. 1-1 is a schematic diagram of a design of a secondary-side winding of a transformer according to a conventional technology 1.
Figures 1, 2:
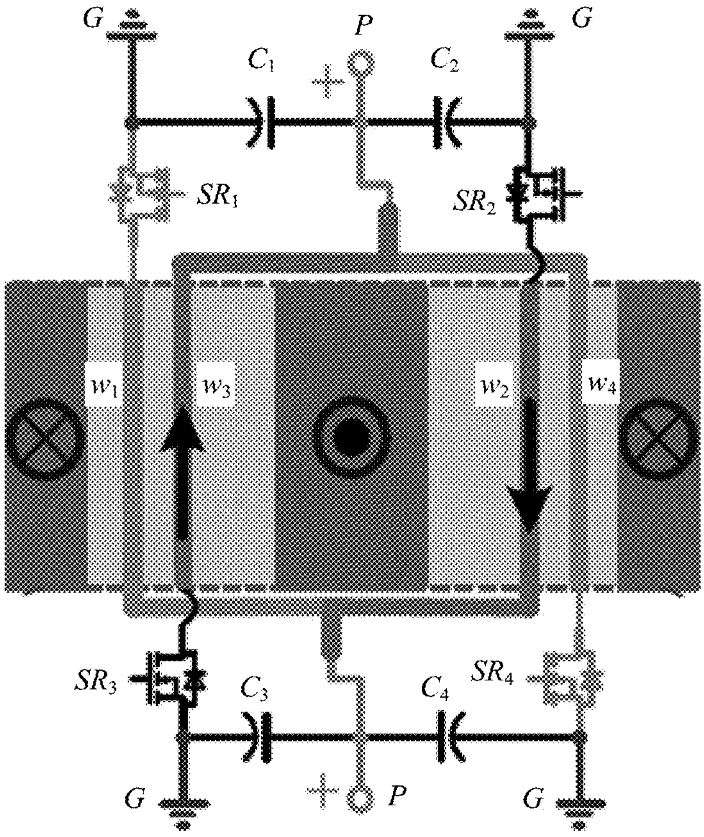
Figures 1, 2, 3:
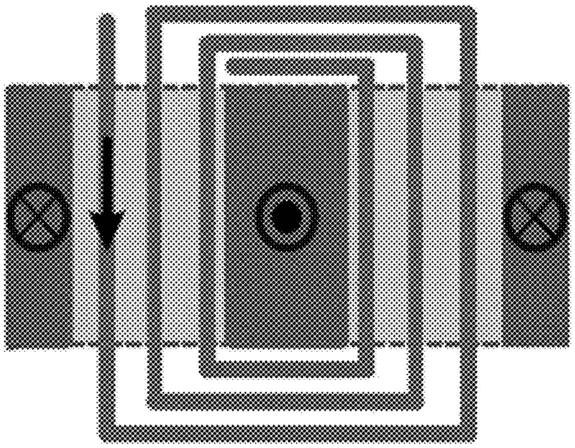
Figures 1, 2:
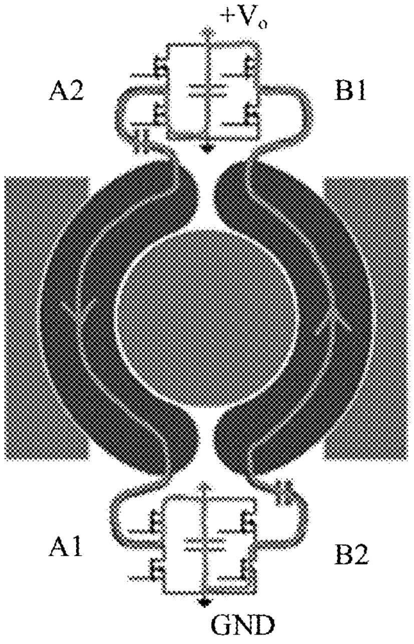
Figure 2:
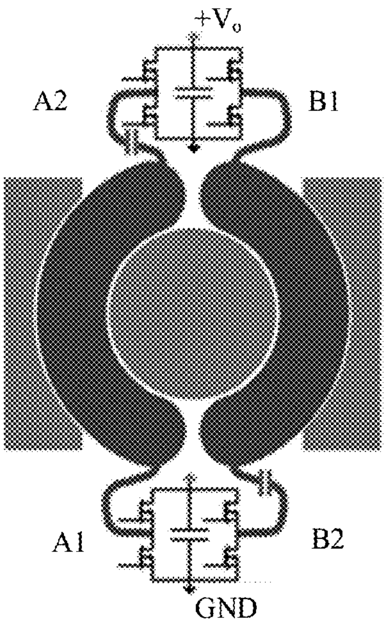
Figures 2, 3:
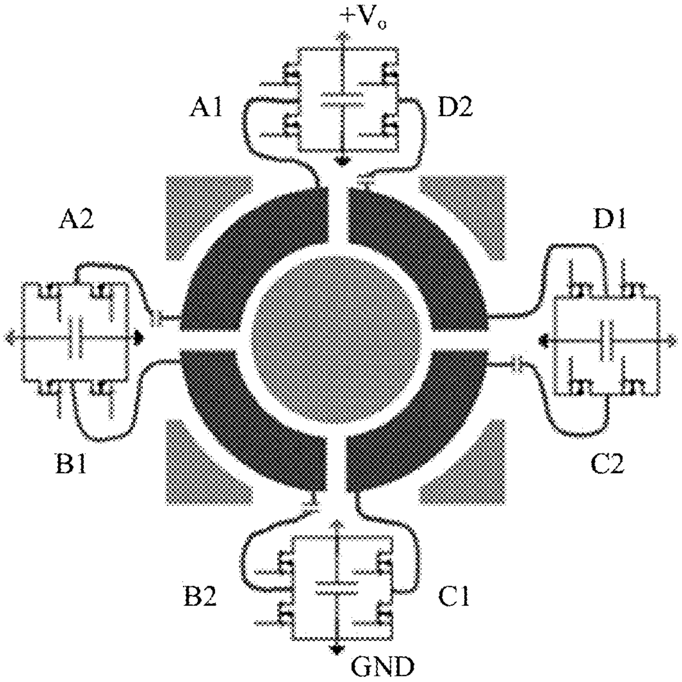
Figures 1, 3:
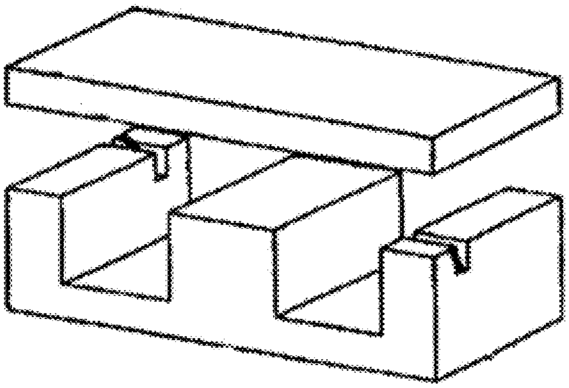
Figures 2, 3:
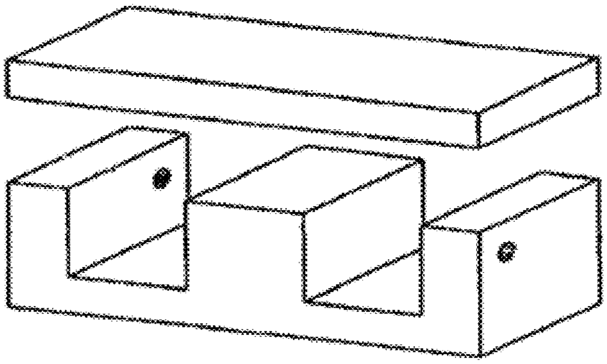

As shown in FIG. 1-1, FIG. 1-2, and FIG. 1-3, in this solution, a secondary-side winding is divided into two windings connected in parallel. When a transformer is designed, w2 and w3 form a one-turn secondary-side winding, and w1 and w4 form another one-turn secondary-side winding. When the transformer works, it is assumed that a primary-side current flows counterclockwise. According to Faraday's law of induction, a direction of a current induced on the secondary-side winding is clockwise, and a flow path of the current is G-SR2-w2-P and G-SR3-w3-P. As shown in FIG. 1-1, G terminals of two secondary-side parallel windings of the transformer are connected together, and P terminals thereof are also connected together. As shown in FIG. 1-2, two half-turn windings w2 and w3 that are connected in parallel jointly form a one-turn winding. Magnetic flux generated when w2 and w3 work simultaneously is equivalent to magnetic flux generated by a one-turn common winding. As shown in FIG. 1-3, a primary-side winding is wound in a conventional winding manner. When a current on the primary-side winding of the transformer flows clockwise, a working principle thereof is similar. In this solution, a quantity of winding turns of the transformer is reduced by half, so that a winding loss of the transformer can be effectively reduced. A disadvantage of a conventional technology 1 is that only 0.5 turns can be designed for the secondary-side winding of the transformer, a quantity of turns of the primary-side winding is limited, and the quantity of turns of the primary-side winding needs to be an even number. For example, when a transformer in which a ratio of a quantity of turns of a primary-side winding to a quantity of turns of a secondary-side winding is 7:1 is designed, the quantity of turns of the secondary-side winding cannot be designed as 0.5 if a same function is met.

In a conventional technology 2, for details, refer to the patent WO2018160962A1, where a design technology of a variable inverter-rectifier transformer (VIRT) is proposed, so that a transformer with a fractional turns ratio can also be designed. As shown in FIG. 2-1, a VIRT with two basic full-bridge units is provided. A1 and A2 form one full-bridge unit, and B1 and B2 form the other full-bridge unit. A working principle of the VIRT is similar to that in the foregoing conventional technology 1. A difference is that the secondary side in the conventional technology 1 is a full-wave rectifier circuit, and a secondary side in the conventional technology 2 is a full-bridge rectifier circuit. For a transformer shown in FIG. 2-2, a winding turns ratio N:0.5 can be designed. For a transformer shown in FIG. 2-3, a winding turns ratio N:0.25 can be designed.

For the solution provided in the conventional technology 2, although a fractional turns ratio in which a quantity of turns of a secondary-side winding of the transformer is 0.5 may be designed, a secondary-side rectifier circuit requires two full-bridge circuits, and many power components are used. If a smaller fractional turns ratio is designed, more power components are required, and a quantity of required drives correspondingly increases. Consequently, engineering implementation is complex, and costs are high.

In a conventional technology 3, as shown in FIG. 3-1 and FIG. 3-2, the patent CN1257518C provides a magnetic core of a transformer that can implement a fractional turns ratio. The transformer proposed in the patent includes a magnetic core including one middle cylinder and two side cylinders, and one groove (FIG. 3-1) or at least one through hole (FIG. 3-2) is disposed on at least one side cylinder. A transformer with a fractional turns ratio is designed by winding a winding around the middle cylinder and the groove or the through hole on the side cylinder of the magnetic core.

The fractional turns ratio design solution proposed in the patent CN1257518C is used only for a magnetic core structure with one middle cylinder and two side cylinders. A basic principle thereof is to wind one or more turns of windings on a secondary side of the transformer, to cancel magnetic flux, and implement a fractional turns ratio. In this design solution, if a quantity of winding turns increase, a loss increases. In addition, when a large-current transformer is designed, an effective magnetic flux area of a side cylinder of a magnetic core is additionally reduced due to a width of a groove or a through hole. Consequently, the magnetic core becomes large, and utilization of the magnetic core is reduced.

In the planar transformer designs provided in the foregoing three solutions, because a fractional quantity of turns cannot be implemented on the primary side, the quantity of winding turns of the transformer cannot be effectively reduced. Consequently, a loss of the transformer is large, and an improvement of a power density of a power supply is also restricted.

Embodiments of this application provide a planar transformer, including a winding structure and a magnetic core structure. The winding structure includes a primary-side winding and a secondary-side winding.

The magnetic core structure includes a plurality of magnetic cylinders, and a quantity of the plurality of magnetic cylinders is greater than or equal to 3. A quantity of primary-side windings is greater than or equal to 1, and a quantity of secondary-side windings is greater than or equal to 1.

One primary-side winding is wound around M magnetic cylinders in the plurality of magnetic cylinders, M is a positive integer, M≥3, and a cross-sectional area of at least one of the M magnetic cylinders is different from a cross-sectional area of another magnetic cylinder. A specific winding manner includes: The primary-side winding is wound around the M magnetic cylinders in series or in series and parallel.

In this application, a winding manner in a winding process is specifically as follows: Series winding means that a winding is wound around a plurality of magnetic cylinders by using one winding terminal, and in the winding process, the winding terminal is independently wound without shunting. Parallel winding means that when a winding starts to be wound by using one winding terminal (current flow-in terminal), a plurality of branches are obtained through division, each branch is wound around several magnetic cylinders, and all the branches are combined into one winding terminal (as a current flow-out terminal) at the end of the winding. Series and parallel winding means that the primary-side winding is wound around X magnetic cylinders in series, and is wound around M-X magnetic cylinders in parallel, where X is a positive integer less than a value of M.

Figures 1, 4:
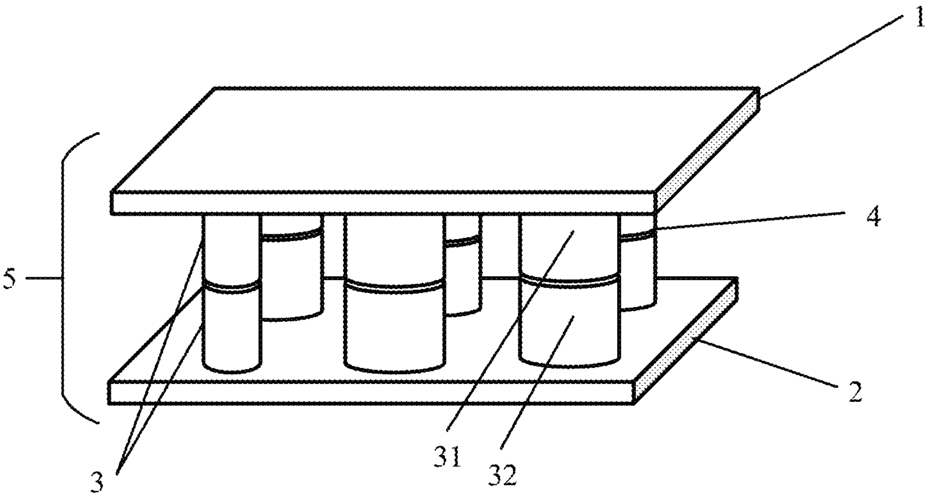
Figures 2, 4:
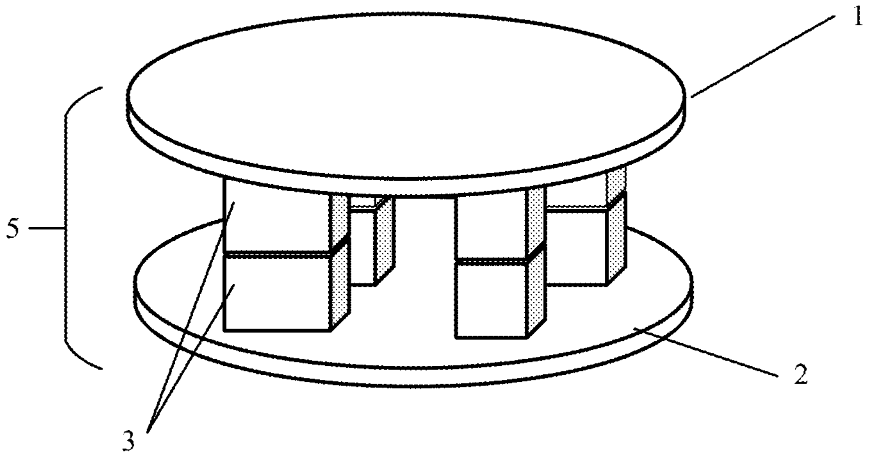

FIG. 4-1 shows a magnetic core structure of a planar transformer according to an embodiment of this application.

A magnetic core structure 5 includes a first magnet part 1, a second magnet part 2, and six magnetic cylinders 3 (that is, a quantity of a plurality of magnetic cylinders included in the magnetic core structure is 6). The magnetic cylinder 3 is located between the first magnet part 1 and the second magnet part 2. Both the first magnet part 1 and the second magnet part 2 are rectangular plate structures, and the magnetic cylinder 3 is a cylindrical structure. A cross-sectional area of at least one magnetic cylinder 3 is different from a cross-sectional area of another magnetic cylinder 3.

Each magnetic cylinder 3 is a separate structure, and includes an upper magnetic cylinder 31 and a lower magnetic cylinder 32. The upper magnetic cylinder 31 and the lower magnetic cylinder 32 have a same cross section, and there is an air gap 4 between the upper magnetic cylinder 31 and the lower magnetic cylinder 32. In addition, the upper magnetic cylinder 31 and the lower magnetic cylinder 32 may form an integral structure. In other words, each magnetic cylinder 3 is formed as an integral structure, that is, the magnetic cylinder 3 is formed as a cylinder, and each magnetic cylinder 3 is a cylinder.

FIG. 4-2 shows another magnetic core structure of a planar transformer according to an embodiment of this application. Both a first magnet part 1 and a second magnet part 2 are circular plate structures, and a magnetic cylinder 3 is a cuboid structure (that is, a quantity of a plurality of magnetic cylinders included in the magnetic core structure is 4). The another structure is similar to that shown in FIG. 4-1, and details are not described again.

For the magnetic core structure provided in the foregoing embodiments of this application, the following variation may be further made during design and manufacture.

Optionally, a quantity of magnetic cylinders 3 may be randomly selected, and is selected based on a specific working condition parameter such as a transformation ratio and a power when the transformer is designed.

Optionally, at least a part of upper magnetic cylinders 31 and the first magnet part 1 may be formed as an integral structure, and at least a part of lower magnetic cylinders 32 and the second magnet part 32 may also be formed as an integral structure, to facilitate mounting of the transformer and winding of a winding.

Optionally, when the magnetic cylinder 3 is designed as an integral structure, a part of magnetic cylinders 3 and the first magnet part 1 may be further formed as an integral structure, and another part of magnetic cylinders and the second magnet part 32 may be formed as an integral structure.

Optionally, the first magnet part 1 and/or the second magnet part 2 may be another irregular plate body, and a cross section of the magnetic cylinder 3 may be oval, rectangular, square, or irregularly shaped, so that the transformer can be designed to match different types of mounting space.

Optionally, in the plurality of magnetic cylinders 3, height ratios between the upper magnetic cylinders 31 and the lower magnetic cylinders 32 of all the magnetic cylinders 3 may be equal or unequal. Therefore, more manufacture errors can be allowed, and manufacture costs can be reduced.

Optionally, in the plurality of magnetic cylinders 3, heights of an upper magnetic cylinder 31 and a lower magnetic cylinder 32 of any magnetic cylinder 3 may be equal or unequal. Therefore, more manufacture errors can be allowed, and manufacture costs can be reduced.

The magnetic core structure provided in the foregoing embodiments of this application is used as an example below to describe the winding structure of the planar transformer provided in embodiments of this application.

Figure 5:
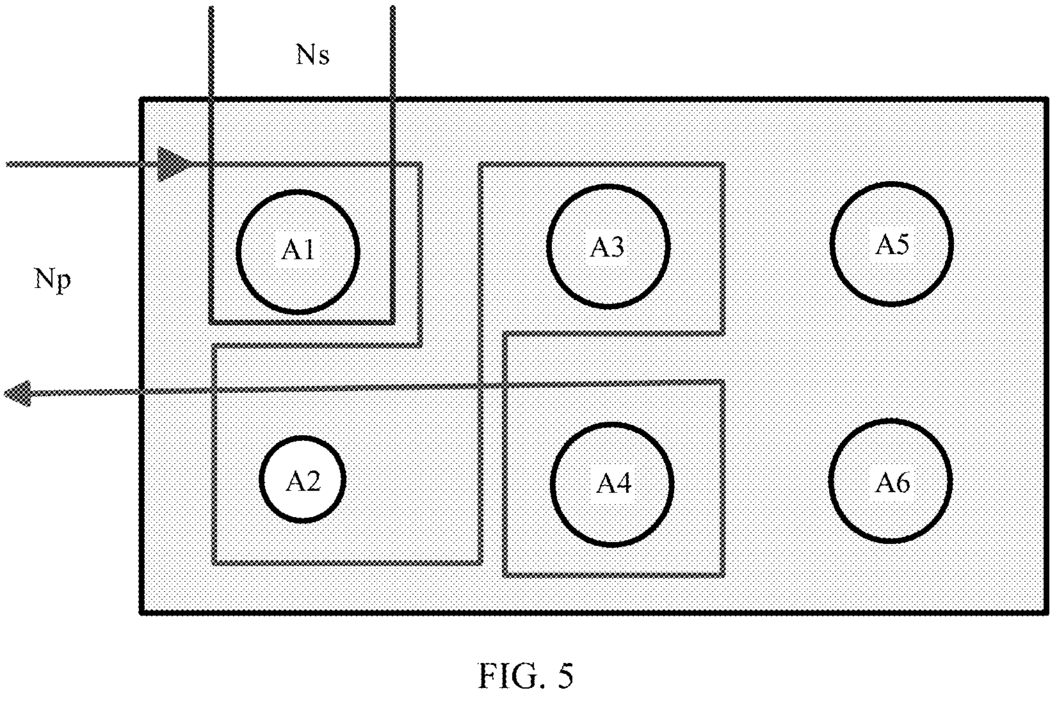
FIG. 5 is a schematic diagram of a winding structure (one primary-side winding is wound in series) of a planar transformer according to an embodiment of this application.

FIG. 5 shows a schematic diagram of winding a primary-side winding around M magnetic cylinders in series. The primary-side winding is wound around four (namely, M=4) magnetic cylinders in six magnetic cylinders, and a secondary-side winding is wound around one magnetic cylinder in the six magnetic cylinders. The following specifically describes a principle of the planar transformer provided in this embodiment.

Cross-sectional areas of the six magnetic cylinders are respectively Ae1, Ae2, Ae3, Ae4, Ae5, and Ae6. It is assumed that Ae1=2Ae2=Ae3=Ae4=Ae5=Ae6. The primary-side winding is wound around the first four magnetic cylinders in series, and is wound around each of the first four magnetic cylinders by one turn. The secondary-side winding is wound around the first magnetic cylinder by one turn.

According to Faraday's law of induction:

$$\phi 1 = \frac{Np1*Ip}{R1},\ \phi 2 = \frac{Np2*Ip}{R2},\ \phi 3 = \frac{Np3*Ip}{R3},\ \phi 4 = \frac{Np4*Ip}{R4}$$

where

ø1, ø2, ø3, ø4 are respectively magnetic flux generated by the primary-side winding on magnetic cylinders A1, A2, A3, and A4;

Np1, Np2, Np3, and Np4 are respectively quantities of winding turns generated by the primary-side winding on the magnetic cylinders A1, A2, A3, and A4, and in this example, Np1=Np2=Np3=Np4=1;

Ip is a current on the primary-side winding; and

R1, R2, R3, and R4 are respectively magnetic resistances on the magnetic cylinders A1, A2, A3, and A4.

A voltage Up of the primary-side winding is as follows:

$$\begin{aligned} Up &= Np1*\frac{d\phi 1}{dt} + Np2*\frac{d\phi 2}{dt} + Np3*\frac{d\phi 3}{dt} + Np4*\frac{d\phi 4}{dt} \\ &= \frac{d\phi 1}{dt} + \frac{d\phi 2}{dt} + \frac{d\phi 3}{dt} + \frac{d\phi 4}{dt} \\ &= \frac{d\left(\frac{Np1*Ip}{R1}\right)}{dt} + \frac{d\left(\frac{Np2*Ip}{R2}\right)}{dt} + \frac{d\left(\frac{Np3*Ip}{R3}\right)}{dt} + \frac{d\left(\frac{Np4*Ip}{R4}\right)}{dt} \\ &= \frac{1}{R1}*\frac{dIp}{dt} + \frac{1}{R2}*\frac{dIp}{dt} + \frac{1}{R3}*\frac{dIp}{dt} + \frac{1}{R4}*\frac{dIp}{dt} \\ &= \left(\frac{1}{R1} + \frac{1}{R2} + \frac{1}{R3} + \frac{1}{R4}\right)*\frac{dIp}{dt} \end{aligned}$$

where Ns indicates a quantity of winding turns generated by the secondary-side winding on the cylinder A1, and in this example, Ns=1.

A voltage Us of the secondary-side winding is as follows:

$$\begin{aligned} Us &= Ns*\frac{d\phi 1}{dt} \\ &= 1*\frac{d\phi 1}{dt} \\ &= 1*\frac{d\left(\frac{Np1*Ip}{R1}\right)}{dt} \\ &= \frac{1}{R1}*\frac{dIp}{dt} \end{aligned}$$

A transformation ratio K of the transformer is as follows:

$$K = \frac{Up}{Us} = \frac{\frac{1}{R1} + \frac{1}{R2} + \frac{1}{R3} + \frac{1}{R4}}{\frac{1}{R1}}$$

The magnetic resistance R is defined as follows:

$$R = \frac{l}{\mu * Ae}$$

where l is a magnetic circuit length;

μ is magnetic permeability of a magnetic circuit material; and

Ae is a cross-sectional area of a magnetic circuit.

In this embodiment, the four magnetic cylinders are all located between the first magnet part and the second magnet part, and the four magnetic cylinders have a same height, that is, the magnetic cylinders have a same magnetic circuit length. In addition, the magnetic cylinders have a same material, that is, have same permeability. Only cross-sectional areas of the magnetic cylinders are different. The cross-sectional areas of the four magnetic cylinders are respectively represented as Ae1, Ae2, Ae3, and Ae4. In this case, a relationship among the cross-sectional areas is Ae1=2Ae2=Ae3=Ae4.

Therefore, $$K = \frac{Up}{Us} = \frac{Ae1 + Ae2 + Ae3 + Ae4}{Ae1} = 3.5$$

Therefore, it may be learned that, according to the planar transformer provided in this embodiment of this application, a fractional transformation ratio may be implemented. Compared with a conventional transformer design, the planar transformer provided in this embodiment of this application has an advantage shown in the following Table 1: When a transformation ratio 3.5 is implemented, a quantity of winding turns of the planar transformer provided in this embodiment of this application is 44% less than that of the conventional transformer (four turns are reduced).

TABLE 1

Table of comparison between quantities of turns of a conventional transformer and a planar transformer provided in the embodiment in FIG. 5 in this application

| | Turns ratio | Quantity of turns of a primary-side winding | Quantity of turns of a secondary-side winding | Remarks |
|---|---|---|---|---|
| Traditional transformer | 3.5 | 7 | 2 | Nine turns of windings in total |
| Transformer in the embodiment in FIG. 5 | 3.5 | 4 | 1 | Five turns of windings in total |

According to the transformer shown in FIG. 5, the primary-side winding is wound around only four magnetic cylinders. It may be understood that a quantity of magnetic cylinders around which the primary-side winding is wound is optional, and the quantity of magnetic cylinders may be selected as any value greater than three based on different design requirements.

Figure 6:
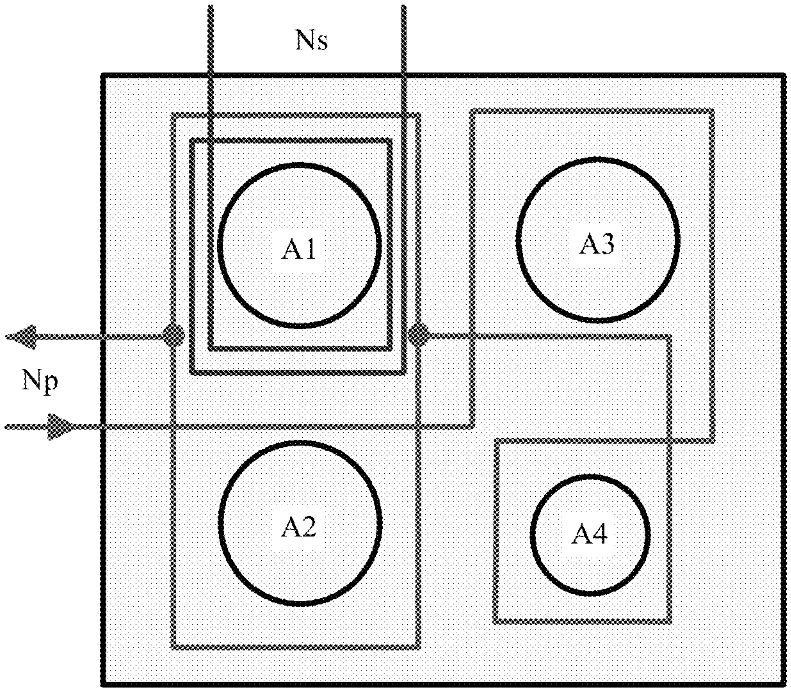
FIG. 6 is a schematic diagram of another winding structure (one primary-side winding is wound in series) of a planar transformer according to an embodiment of this application.

FIG. 6 provides another type of transformer. A primary-side winding is wound around a plurality of magnetic cylinders in series and parallel. The transformer is provided with four magnetic cylinders. The primary-side winding is wound around magnetic cylinders A3 and A4 in series, and is wound around magnetic cylinders A1 and A2 in parallel, to form a series and parallel winding manner. The following specifically describes the planar transformer provided in this embodiment.

Cross-sectional areas of the four magnetic cylinders of a magnetic core of the transformer are respectively Ae1, Ae2, Ae3, and Ae4, where Ae1=Ae2=Ae3=2Ae4. The primary-side winding is wound around each of the magnetic cylinders A3 and A4 by one turn, and then wound around the magnetic cylinders A1 and A2 in parallel by one turn. A secondary-side winding is wound around the magnetic cylinder A1 by two turns.

According to Faraday's law of induction:

$$\phi 1 = \frac{Np1 * \frac{Ip}{2}}{R1},\ \phi 2 = \frac{Np2 * \frac{Ip}{2}}{R2},\ \phi 3 = \frac{Np3 * Ip}{R3},\ \phi 4 = \frac{Np4 * Ip}{R4},$$

where

ø1, ø2, ø3, ø4 are respectively magnetic flux generated by the primary-side winding on the magnetic cylinders A1, A2, A3, and A4;

Np1, Np2, Np3, and Np4 are respectively quantities of turns by which the primary-side winding is wound around the magnetic cylinders A1, A2, A3, and A4, and in this example, Np1=Np2=Np3=Np4=1;

Ip is a current on a trunk of the primary-side winding; and

R1, R2, R3, and R4 are respectively magnetic resistances on the magnetic cylinders A1, A2, A3, and A4.

A voltage Up of the primary-side winding is as follows:

$$\begin{aligned} Up &= Np1 * \frac{d\phi 1}{dt} + Np2 * \frac{d\phi 2}{dt} + Np3 * \frac{d\phi 3}{dt} + Np4 * \frac{d\phi 4}{dt} \\ &= \frac{d\phi 1}{dt} + \frac{d\phi 2}{dt} + \frac{d\phi 3}{dt} + \frac{d\phi 4}{dt} \\ &= \frac{d\left(\frac{Np1 * \frac{Ip}{2}}{R1}\right)}{dt} + \frac{d\left(\frac{Np2 * \frac{Ip}{2}}{R2}\right)}{dt} + \frac{d\left(\frac{Np3 * Ip}{R3}\right)}{dt} + \frac{d\left(\frac{Np4 * Ip}{R4}\right)}{dt} \end{aligned}$$

-continued $$\begin{aligned} &= \frac{1}{2R1} * \frac{dIp}{dt} + \frac{1}{2R2} * \frac{dIp}{dt} + \frac{1}{R3} * \frac{dIp}{dt} + \frac{1}{R4} * \frac{dIp}{dt} \\ &= \left(\frac{1}{2R1} + \frac{1}{2R2} + \frac{1}{R3} + \frac{1}{R4}\right) * \frac{dIp}{dt} \end{aligned}$$

A voltage Us of the secondary-side winding is as follows:

$$Us = Ns * \frac{d\phi 1}{dt}$$

where Ns is used to indicate a quantity of turns by which the secondary-side winding is wound around the magnetic cylinder A1, and in this example, Ns=2.

Therefore:

$$Us = 2 * \frac{d\phi 1}{dt}$$

-continued $$= 2 * \frac{d\left(\frac{Np1 * \frac{Ip}{2}}{R1}\right)}{dt}$$

$$= \frac{1}{R1} * \frac{dIp}{dt}$$

A transformation ratio K of the transformer is as follows:

$$K = \frac{Up}{Us} = \frac{\frac{1}{2R1} + \frac{1}{2R2} + \frac{1}{R3} + \frac{1}{R4}}{\frac{1}{R1}}$$

The magnetic resistance R is defined as follows:

$$R = \frac{l}{\mu * Ae}$$

where l is a magnetic circuit length, μ is magnetic permeability of a magnetic circuit material, and Ae is a cross-sectional area of a magnetic circuit. In this example, the magnetic cylinders have a same length, and also have same magnetic permeability. Only the cross-sectional areas are different, and the cross-sectional areas are Ae1=Ae2=Ae3=2Ae4. Therefore, $$K = \frac{Up}{Us} = \frac{\frac{Ae1}{2} + \frac{Ae2}{2} + Ae3 + Ae4}{Ae1} = 2.5$$

In this embodiment of this application, the primary-side winding is wound around a plurality of magnetic cylinders in series and parallel, and a cross-sectional area of at least one magnetic cylinder is not equal to a cross-sectional area of another magnetic cylinder, so that a fractional turns ratio can be implemented.

Therefore, it may be learned that, according to the planar transformer provided in FIG. 6, a fractional transformation ratio may be implemented. Compared with a conventional transformer design, the planar transformer provided in FIG. 6 has an advantage shown in the following Table 2: When a transformation ratio 2.5 is implemented, a quantity of winding turns of the planar transformer provided in this embodiment of this application is 43% less than that of the conventional transformer (three turns are reduced based on seven turns).

TABLE 2

Table of comparison between quantities of turns of a conventional transformer and a planar transformer provided in the embodiment in FIG. 6

| | Turns ratio | Quantity of turns of a primary-side winding | Quantity of turns of a secondary-side winding | Remarks |
|---|---|---|---|---|
| Traditional transformer | 2.5 | 5 | 2 | Seven turns of windings in total |
| Transformer in the embodiment in FIG. 6 | 2.5 | 3 | 1 | Four turns of windings in total |

Figure 7:
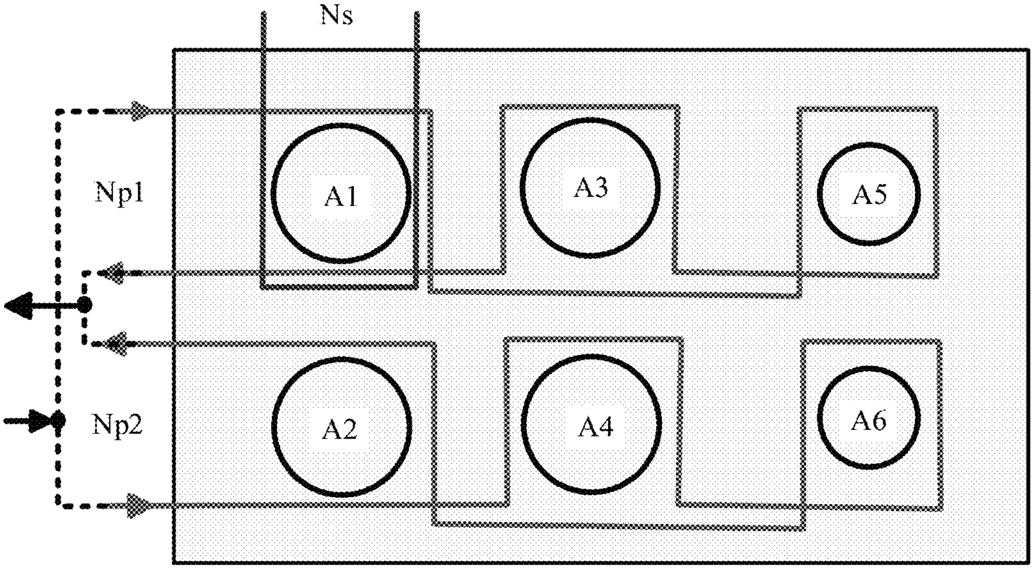
FIG. 7 is a schematic diagram of still another winding structure (a plurality of primary-side windings are separately wound in series) of a planar transformer according to an embodiment of this application.

FIG. 7 provides another planar transformer. The transformer is provided with a plurality of primary-side windings, and each primary-side winding is wound around a plurality of magnetic cylinders. The transformer is provided with two primary-side windings, and each primary-side winding is wound around three magnetic cylinders. To facilitate differentiation, the two primary-side windings are referred to as a first primary-side winding and a primary-side parallel winding.

The following specifically describes the planar transformer provided in FIG. 7.

The first primary-side winding and the primary-side parallel winding are connected in parallel. (It may be understood that, if the first primary-side winding is connected in series with the primary-side parallel winding, the transformer is similar to the type of the planar transformer provided in FIG. 5: One primary-side winding is wound around six magnetic cylinders in series.)

Cross-sectional areas of the six magnetic cylinders are respectively Ae1=Ae2=Ae3=Ae4=2Ae5=2Ae6. The first primary-side winding is wound around magnetic cylinders A1, A3, and A5 in series, and is wound around each of the three magnetic cylinders by one turn. The primary-side parallel winding is wound around magnetic cylinders A2, A4, and A6 in series, and is wound around each of the three magnetic cylinders by one turn.

According to Faraday's law of induction:

$$\phi 1 = \frac{Np11 * \frac{Ip}{2}}{R1}, \phi 3 = \frac{Np13 * \frac{Ip}{2}}{R3}, \phi 5 = \frac{Np15 * \frac{Ip}{2}}{R5},$$

$$\phi 2 = \frac{Np22 * \frac{Ip}{2}}{R2}, \phi 4 = \frac{Np24 * \frac{Ip}{2}}{R4}, \phi 6 = \frac{Np26 * \frac{Ip}{2}}{R6},$$

where

ø1, ø3, ø5 are respectively magnetic flux generated by the first primary-side winding on the magnetic cylinders A1, A3, and A5;

Np11, Np13, and Np15 are respectively quantities of turns by which the first primary-side winding is wound around the magnetic cylinders A1, A3, and A5, Np22, Np24, and Np26 are respectively quantities of turns by which the primary-side parallel winding is wound around the magnetic cylinders A2, A4, and A6, and in this example, Np11=Np13=Np15=Np22=Np24=Np26=1;

Ip is a current on a trunk of the primary-side winding, and because the first primary-side winding and the primary-side parallel winding are connected in parallel, a current on each of the first primary-side winding and the primary-side parallel winding is lp/2; and R1, R2, R3, R4, R5, and R6 are respectively magnetic resistances on the magnetic cylinders A1, A2, A3, A4, A5, and A6.

A voltage Up1 of the first primary-side winding is as follows:

$$\begin{aligned} Up1 &= Np11*\frac{d\phi 1}{dt} + Np13*\frac{d\phi 3}{dt} + Np15*\frac{d5}{dt} \\ &= \frac{d\phi 1}{dt} + \frac{d\phi 3}{dt} + \frac{d\phi 5}{dt} \\ &= \frac{d\left(\frac{Np11*\frac{Ip}{2}}{R1}\right)}{dt} + \frac{d\left(\frac{Np13*\frac{Ip}{2}}{R3}\right)}{dt} + \frac{d\left(\frac{Np15*\frac{Ip}{2}}{R5}\right)}{dt} \\ &= \frac{1}{2R1}*\frac{dIp}{dt} + \frac{1}{2R3}*\frac{dIp}{dt} + \frac{1}{2R5}*\frac{dIp}{dt} \\ &= \left(\frac{1}{2R1} + \frac{1}{2R3} + \frac{1}{2R5}\right)*\frac{dIp}{dt} \end{aligned}$$

A voltage Us of a secondary-side winding is as follows:

$$Us = Ns*\frac{d\phi 1}{dt}$$

where Ns is a quantity of turns by which the secondary-side winding is wound around the magnetic cylinder A1, and in this example, Ns=1.

Therefore:

$$\begin{aligned} Us &= 1*\frac{d\phi 1}{dt} \\ &= 1*\frac{d\left(\frac{Np11*\frac{Ip}{2}}{R1}\right)}{dt} \\ &= \frac{1}{2R1}*\frac{dIp}{dt} \end{aligned}$$

A transformation ratio K of the transformer is as follows:

$$K = \frac{Up1}{Us} = \frac{\frac{1}{2R1} + \frac{1}{2R3} + \frac{1}{2R5}}{\frac{1}{2R1}}$$

The magnetic resistance R is defined as follows:

$$R = \frac{l}{\mu * Ae}$$

where 1 is a magnetic circuit length, μ is magnetic permeability of a magnetic circuit material, and Ae is a cross-sectional area of a magnetic circuit. In this example, the magnetic cylinders have a same length, and also have same magnetic permeability. Only the cross-sectional areas are different, and the cross-sectional areas are Ae1=Ae2=Ae3=Ae4=2Ae5=2Ae6. Therefore, $$K = \frac{Up}{Us} = \frac{\frac{Ae1}{2} + \frac{Ae3}{2} + \frac{Ae5}{2}}{\frac{Ae1}{2}} = 2.5$$

Therefore, it may be learned that, according to the planar transformer provided in FIG. 7, a fractional transformation ratio may be implemented. Compared with a conventional transformer design, the planar transformer provided in FIG. 7 has an advantage shown in the following Table 3: When a transformation ratio 2.5 is implemented, a quantity of winding turns of the planar transformer provided in this embodiment of this application is 43% less than that of the conventional transformer (three turns are reduced based on seven turns).

TABLE 3

Table of comparison between quantities of turns of a conventional transformer and a planar transformer provided in the embodiment in FIG. 7

| | Turns ratio | Quantity of turns of a primary-side winding | Quantity of turns of a secondary-side winding | Remarks |
|---|---|---|---|---|
| Traditional transformer | 2.5 | 5 | 2 | Seven turns of windings in total |
| Transformer in the embodiment in FIG. 7 | 2.5 | 3 | 1 | Four turns of windings in total |

It may be understood that according to the planar transformer provided in the embodiment in FIG. 7, the primary-side parallel winding is optional, and only one of the two primary-side windings may be reserved, to similarly output a transformation ratio 2.5.

In the embodiment in FIG. 7, the first primary-side winding is wound around the magnetic cylinders A1, A3, and A5 in series, and the primary-side parallel winding is wound around the magnetic cylinders A2, A4, and A6 in series. A sum of cross-sectional areas of the magnetic cylinders A1, A3, and A5 is equal to a sum of cross-sectional areas of the magnetic cylinders A2, A4, and A6. With such winding and design, when a basic transformer formed by the first primary-side winding and a basic transformer formed by the primary-side parallel winding form a parallel transformer, output voltage values of the two basic transformers can be the same, to prevent a cross current from occurring inside the parallel transformer due to different output voltage values of the two basic transformers.

In engineering implementation, due to a manufacture error and a mounting error between the cross-sectional areas of the magnetic cylinders, in practice, the sum of the cross-sectional areas of the magnetic cylinders around which the first primary-side winding is wound cannot be totally equal to the sum of the cross-sectional areas of the magnetic cylinders around which the primary-side parallel winding is wound. During specific design, through a plurality of experimental tests, the inventor of this application finds that there is good output efficiency when a ratio of the sum of the cross-sectional areas, of the magnetic cylinders around which the primary-side parallel winding is wound, to the sum of the cross-sectional areas of the magnetic cylinders around which the first primary-side winding is wound is selected to be 80% to 120%. In other words, a ratio of a sum of cross-sectional areas, of magnetic cylinders around which each primary-side parallel winding is wound, to the sum of the cross-sectional areas of the magnetic cylinders around which the first primary-side winding is wound is preferably set as a value that falls within 80% to 120%.

Further, referring to FIG. 8-1, FIG. 8-2, FIG. 8-3, and FIG. 8-4, an embodiment of this application further provides a planar transformer provided with a plurality of secondary-side windings, and transformers with four different transformation ratios are used as an example for description. It is assumed that there are four secondary-side windings, one secondary-side winding is referred to as a first secondary-side winding, and the other secondary-side windings are referred to as secondary-side parallel windings.

Figures 1, 8:
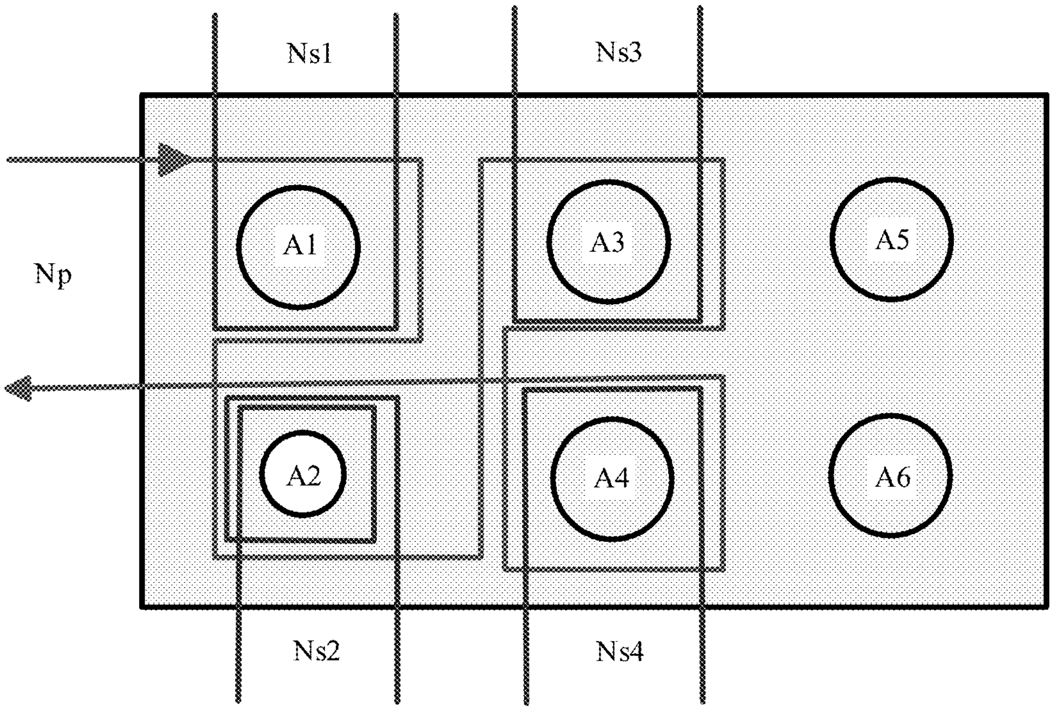
Figures 2, 8:
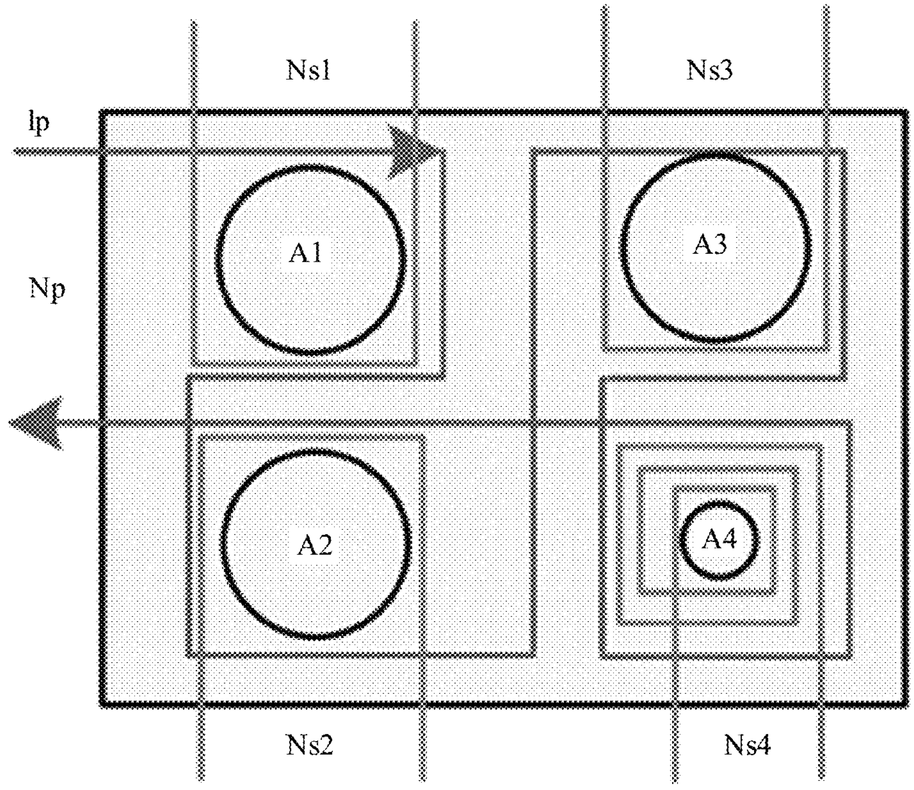
Figures 3, 8:
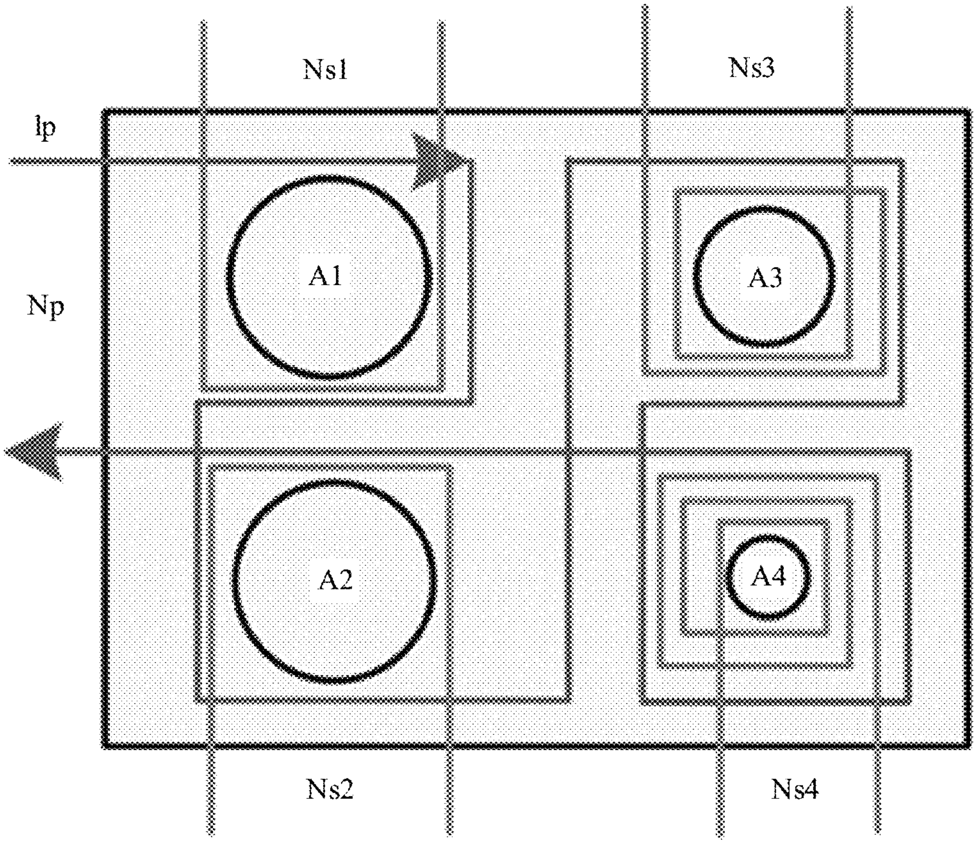
Figures 4, 8:
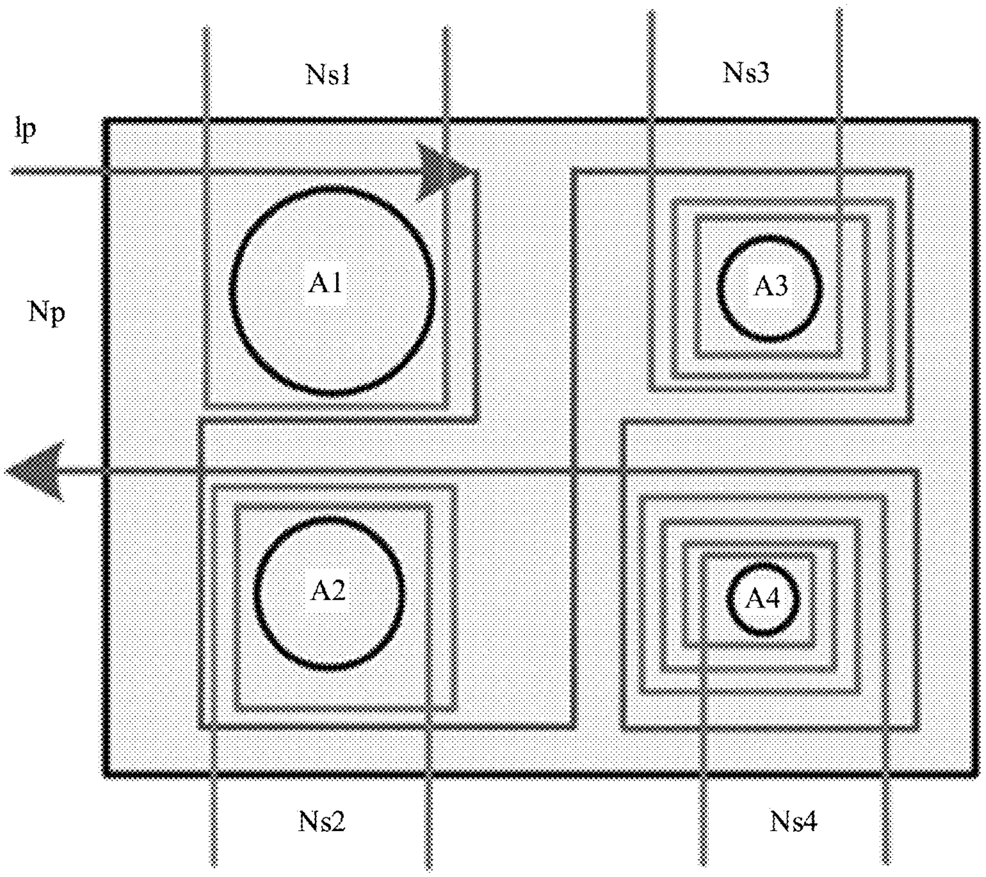

FIG. 8-1 shows a planar transformer obtained by adding three secondary-side windings based on the planar transformer shown in FIG. 6. Four magnetic cylinders A1, A2, A3, and A4 respectively form four basic transformers, and the four secondary-side windings are connected in parallel, to form a final matrix transformer. Secondary-side windings are respectively wound around the corresponding magnetic cylinders A1, A3, and A4 by one turn, and a secondary-side winding is wound around the magnetic cylinder A2 by two turns.

For the basic transformers formed by the magnetic cylinders A1, A3, and A4, transformation ratios thereof are K1=K3=K5=3.5. For a specific principle, refer to the foregoing formula.

For the basic transformer formed by the magnetic cylinder A2, a voltage value of the secondary-side winding is as follows:

$$
\begin{aligned}
Us2 &= Ns2 * \frac{d\phi 2}{dt} \\
&= 2 * \frac{d\phi 2}{dt} \\
&= 2 * \frac{d\left(\frac{Np2 * Ip}{R2}\right)}{dt} \\
&= \frac{2}{R2} * \frac{dIp}{dt}
\end{aligned}
$$

For the basic transformer formed by the magnetic cylinder A2, a transformation ratio K2 thereof is as follows:

$$
\begin{aligned}
K2 = \frac{Up}{Us2} &= \frac{\frac{1}{R1} + \frac{1}{R2} + \frac{1}{R3} + \frac{1}{R4}}{\frac{2}{R2}} \\
&= \frac{Ae1 + Ae2 + Ae3 + Ae4}{2Ae2} \\
&= 3.5
\end{aligned}
$$

Therefore, the transformation ratios of the four basic transformers formed by the four magnetic cylinders A1, A2, A3, and A4 are all 3.5 by using the matrix transformer formed by connecting the four secondary-side windings in parallel.

According to the planar transformer provided in this solution, the transformation ratios of the four basic transformers respectively formed by the four magnetic cylinders A1, A2, A3, and A4 are equal, and are all 3.5. Cross-sectional areas of the four magnetic cylinders around which the four secondary-side windings are wound are Ae1:Ae2:Ae3:Ae4=2:1:2:2, and quantities of turns of the four secondary-side windings are Ns1:Ns2:Ns3:Ns4=1:2:1:1. In other words, the quantity of turns and the magnetic cylinder are set by using a formula Ae1*Ns1=Ae2*Ns2=Ae3*Ns3=Ae4*Ns4, so that it can be ensured that output voltage values of the four secondary-side windings are equal, to reduce a phenomenon that clamping and a cross current occur inside the transformer, and facilitate steady-state output of the planar transformer.

It may be learned that in an actual processing process, for a mechanical part of the transformer such as the magnetic cylinder, due to a factor such as manufacture precision and a processing error, a structural parameter of the mounted magnetic cylinder is difficult to achieve 100% precision required during design. Through a design test, the inventor of this application debug and verify on the planar transformer provided in this application, to design, as a reference value M, a value of Ae1*Ns1 obtained by using one magnetic cylinder and a corresponding secondary-side winding, and design other magnetic cylinders and a plurality of secondary-side windings of the planar transformer to meet the following condition: values of Ae2*Ns2, Ae3*Ns3, and Ae4*Ns4 all fall within a range of 80%*M to 120%*M. In this case, the foregoing technical effect can be well ensured, so that output voltage values of the secondary-side windings are approximately equal, and power control of the planar transformer is more accurate.

According to the planar transformer shown in FIG. 8-2, cross-sectional areas of four magnetic cylinders are Ae1=Ae2=Ae3=3*Ae4, that is, Ae1:Ae2:Ae3:Ae4=3:3:3:1. Quantities of turns of four secondary-side windings on the four magnetic cylinders are Ns1:Ns2:Ns3:Ns4=1:1:1:3. Output voltage values of the four secondary-side windings are equal. Transformation ratios of four basic transformers corresponding to the four magnetic cylinders are all 10/3 (for a specific calculation principle, refer to the foregoing formula). A transformation ratio of a matrix transformer formed by connecting the four secondary-side windings in parallel is 10/3.

According to the planar transformer shown in FIG. 8-3, cross-sectional areas of four 1 magnetic cylinders are Ae1=Ae2=2*Ae3=3*Ae4, that is, Ae1:Ae2:Ae3:Ae4=1:1:1 2 3 Quantities of turns of four secondary-side windings on the four magnetic cylinders are Ns1:Ns2:Ns3:Ns4=1:1:2:3. Output voltage values of the four secondary-side windings are equal. Transformation ratios of four basic transformers corresponding to the four magnetic cylinders are all 17/6. A transformation ratio of a matrix transformer formed by connecting the four secondary-side windings in parallel is 17/6.

According to the planar transformer shown in FIG. 8-4, cross-sectional areas of four magnetic cylinders are Ae1=Ae2=3*Ae3=4*Ae4, that is, Ae1:Ae2:Ae3:Ae4=1:1:1/3:1/4. Quantities of turns of four secondary-side windings on the four magnetic cylinders are Ns1:Ns2:Ns3:Ns4=1:1:3:4. Output voltage values of the four secondary-side windings are equal. Transformation ratios of four basic transformers corresponding to the four magnetic cylinders are all 25/12. A transformation ratio of a matrix transformer formed by connecting the four secondary-side windings in parallel is 25/12.

Figure 9:
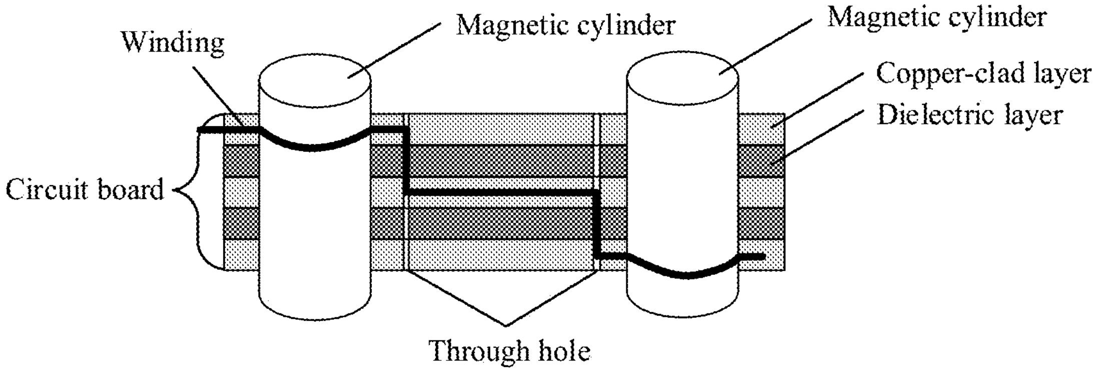
FIG. 9 is a schematic diagram of winding when a planar transformer is wound around a multi-layer circuit board according to this application.

For the planar transformer provided in the foregoing embodiment, a common form of the planar transformer is that a magnetic cylinder passes through a printed circuit board, and a winding is a conducting wire disposed on the printed circuit board. The printed circuit board is usually of a multi-layer structure, and includes a plurality of copper-clad layers and dielectric layers. Copper foil on the copper-clad layer is used to form a route of a winding of a transformer. It may be understood that, in embodiments of this application, a quantity of copper-clad layers on which the winding is disposed is not limited. For example, the winding may be formed across layers on two or more copper-clad layers to avoid a case of "wire stacking" ("wire stacking" means that in a process in which the winding is wound around a magnetic cylinder, lines of the winding are crossed, thereby forming a short circuit). As shown in FIG. 9, the winding is formed across layers on the two or more copper-clad layers. When the line of the winding is wound around one copper-clad layer, the case of "wire stacking" may occur. The line of the winding extends along a through hole between layers/or a hole, for accommodating a magnetic cylinder, on the circuit board to another copper-clad layer to continue to complete winding. In other words, copper foil on different copper-clad layers for forming the winding of the transformer is connected by using a wire.

In addition, it may be understood that, the winding of the transformer may also be a wire coated with an insulation layer. In this case, when the winding is wound around the magnetic cylinder, the case of "wire stacking" may be allowed, and the winding may be formed on only one layer of circuit board.

This application further provides an active circuit, and the active circuit includes any planar transformer provided in the foregoing embodiments. The active circuit may be any one or more of the following types: a full-bridge topology circuit, a half-bridge topology circuit, an active clamp topology circuit, an LLC topology circuit, a Buck+LLC two-level topology circuit, a Buck-Boost+LLC two-level topology circuit, a Boost+LLC two-level topology circuit, a forward topology circuit, a flyback topology circuit, an isolated topology circuit, a two-level topology circuit, and a non-isolated topology circuit.

Although this application is described with reference to specific features and embodiments thereof, it is clearly that various modifications and combinations may be made to them without departing from the spirit and scope of this application. Correspondingly, the specification and accompanying drawings are merely example description of this application defined by the appended claims, and are considered as any of and all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A planar transformer comprising:

a winding structure comprises a primary-side winding and a secondary-side winding;

a magnetic core structure comprises a plurality of magnetic cylinders;

the primary-side winding is wound in series and parallel around M magnetic cylinders in the plurality of magnetic cylinders and the secondary-side winding is wound around one of the plurality of magnetic cylinders, wherein M is a positive integer and M≥3, and wherein a cross-sectional area (Ae) of at least one of the M magnetic cylinders is different from a cross-sectional area of another magnetic cylinder; and each of a quantity P of primary-side parallel windings wound around one of the M magnetic cylinders and connected in parallel with the primary-side winding, wherein P is a positive integer and P is ≥2, wherein the quantity P of primary-side parallel windings is wound around P magnetic cylinders in series or in parallel, and wherein a ratio of (i) a sum of cross-sectional areas of the P magnetic cylinders and (ii) a sum of cross-sectional areas of the M magnetic cylinders is from 80% to 120%.

2. The planar transformer according to claim 1, wherein the primary-side winding is wound around X magnetic cylinders in series, and is wound around M-X magnetic cylinders in parallel, and wherein X is a positive integer less than a value of M.

3. The planar transformer according to claim 1 further comprising at least one secondary-side parallel winding, wherein each secondary-side parallel winding is wound around one of the plurality of magnetic cylinders, and wherein the secondary-side winding and the at least one secondary-side parallel winding are connected in parallel.

4. The planar transformer according to claim 3, wherein a total quantity of secondary-side windings and at least one secondary-side parallel winding is P, wherein a ratio of cross-sectional areas of P magnetic cylinders associated with the P secondary-side windings and parallel windings is A1:A2: . . . :AP, wherein quantities of turns of the P secondary-side windings and secondary-side parallel windings around the P magnetic cylinders are, respectively, Ns1, Ns2, . . . , and NsP, and wherein values of A1*Ns1, A2*Ns2, . . . , and AP*NsP meet at least one of the following conditions: (i) the values are equal and (ii) a ratio between any two values is from 80% to 120%.

5. The planar transformer according to claim 1, wherein each of the plurality of magnetic cylinders comprises an upper magnetic cylinder and a lower magnetic cylinder.

6. The planar transformer according to claim 5, wherein a cross section of any one of the plurality of magnetic cylinders is circular, oval, rectangular, square, or irregularly shaped.

7. The planar transformer according to claim 1, wherein the plurality of magnetic cylinders comprise magnetic cylinders A1, A2, A3, A4, A5 and A6, wherein the Ae of each of the magnetic cylinders is Ae1, Ae2, Ae3, Ae4, Ae5 and Ae6, respectively, and wherein Ae1=Ae2=Ae3=Ae4=2Ae5=2Ae6.

8. The planar transformer according to claim 7, wherein the primary-side winding is wound in series around magnetic cylinders A1, A3, and A5.

9. The planar transformer according to claim 8, wherein the primary-side winding is wound in series around each of the magnetic cylinders A1, A3, and A5, and by one turn.

10. The planar transformer according to claim 9, wherein the plurality of primary-side parallel windings is wound in series around magnetic cylinders A2, A4, and A6, and is wound by one turn.

11. An active circuit comprising:

a planar transformer comprising a winding structure and a magnetic core structure, the winding structure comprises primary-side, primary-side parallel, and secondary-side windings, the magnetic core structure comprises a plurality of magnetic cylinders, wherein the primary-side winding is wound in series and parallel around M magnetic cylinders in the plurality of magnetic cylinders and the secondary-side winding is wound around one of the plurality of magnetic cylinders, wherein M is a positive integer and M≥3, wherein a cross-sectional area of at least one of the M magnetic cylinders is different from a cross-sectional area (Ae) of another magnetic cylinder, wherein each of a quantity P of the primary-side parallel windings is wound around one of the M magnetic cylinders and connected in parallel with the primary-side winding, wherein P is a positive integer and P is ≥2, wherein the quantity P of primary-side parallel windings is wound around P magnetic cylinders in series or in parallel, and wherein a ratio of (i) a sum of cross-sectional areas of the P magnetic cylinders and (ii) a sum of cross-sectional areas of the M magnetic cylinders is from 80% to 120%.

12. The active circuit according to claim 11, wherein wherein the primary-side winding is wound around X magnetic cylinders in series, and is wound around M-X magnetic cylinders in parallel, and wherein X is a positive integer less than a value of M.

13. The active circuit according to claim 11, wherein planar transformer further comprises: at least one secondary-side parallel winding, wherein each secondary-side parallel winding is wound around one of the plurality of magnetic cylinders, and wherein the secondary-side winding and the at least one secondary-side parallel winding are connected in parallel.

14. The active circuit according to claim 13, wherein a total quantity of secondary-side windings and at least one secondary-side parallel winding is P, wherein a ratio of cross-sectional areas of P magnetic cylinders associated with the P secondary-side windings and parallel windings is A1:A2: . . . :AP, wherein quantities of turns of the P secondary-side windings and secondary-side parallel windings around the P magnetic cylinders are, respectively, Ns1, Ns2, . . . , and NsP, and wherein values of A1*Ns1, A2*Ns2, . . . , and AP*NsP meet at least one of the following conditions: (i) the values are equal and (ii) a ratio between any two values is from 80% to 120%.

15. The active circuit according to claim 11, wherein each of the plurality of magnetic cylinders comprises an upper magnetic cylinder and a lower magnetic cylinder.

16. The active circuit according to claim 15, wherein a cross section of any one of the plurality of magnetic cylinders is circular, oval, rectangular, square, or irregularly shaped.

17. The active circuit according to claim 11, wherein the plurality of magnetic cylinders comprise magnetic cylinders A1, A2, A3, A4, A5 and A6, wherein the Ae of each of the magnetic cylinders is Ae1, Ae2, Ae3, Ae4, Ae5 and Ae6, respectively, and wherein Ae1=Ae2=Ae3=Ae4=2Ae5=2Ae6.

18. The active circuit according to claim 17, wherein the primary-side winding is wound in series around magnetic cylinders A1, A3, and A5.

19. The active circuit according to claim 18, wherein the primary-side winding is wound in series around each of the magnetic cylinders A1, A3, and A5, and by one turn.

20. The planar transformer according to claim 19, wherein the plurality of primary-side parallel windings is wound in series around magnetic cylinders A2, A4, and A6, and is wound by one turn.

* * * * *